United States Patent Office 2,973,665
Patented Mar. 7, 1961

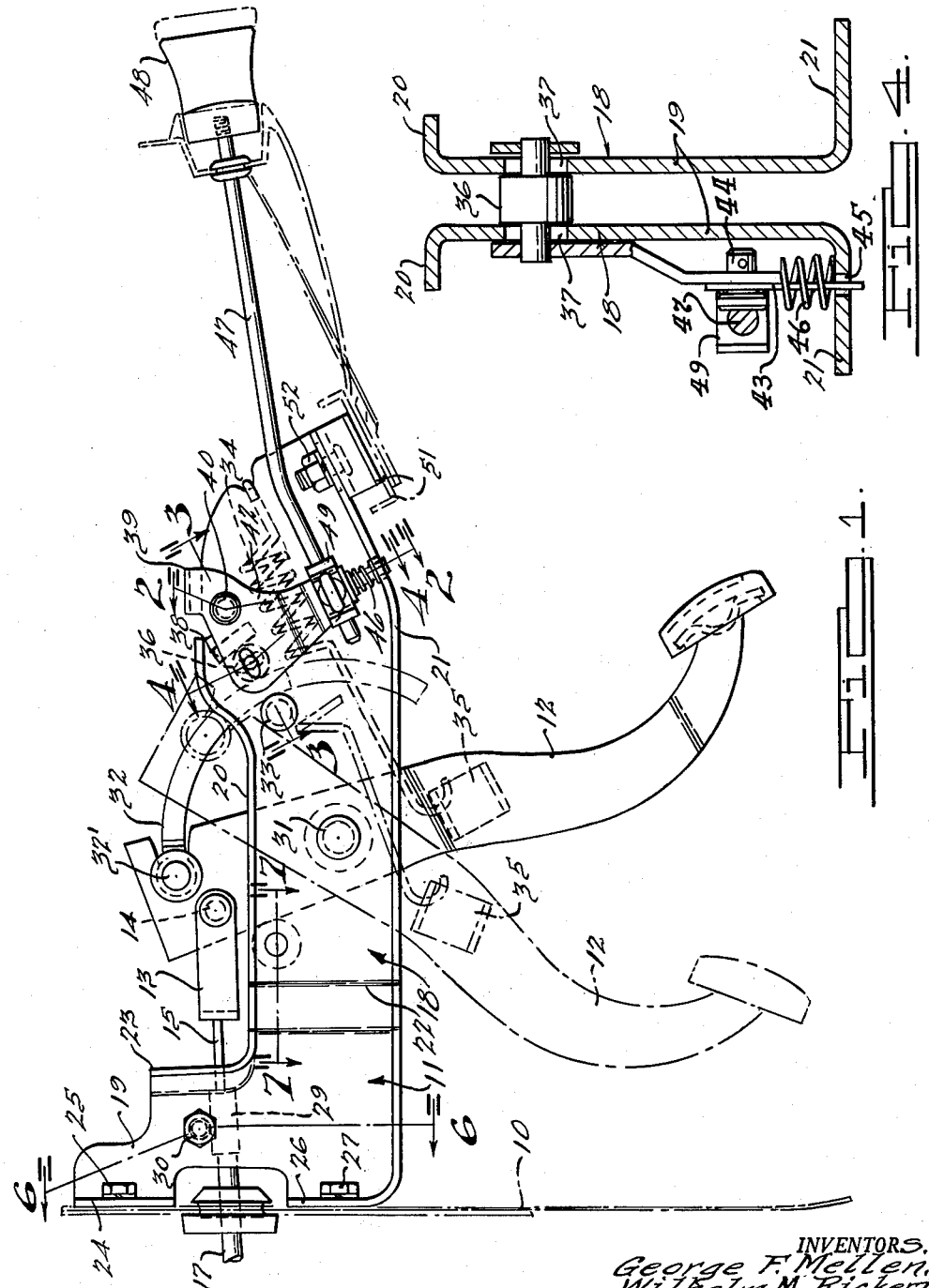

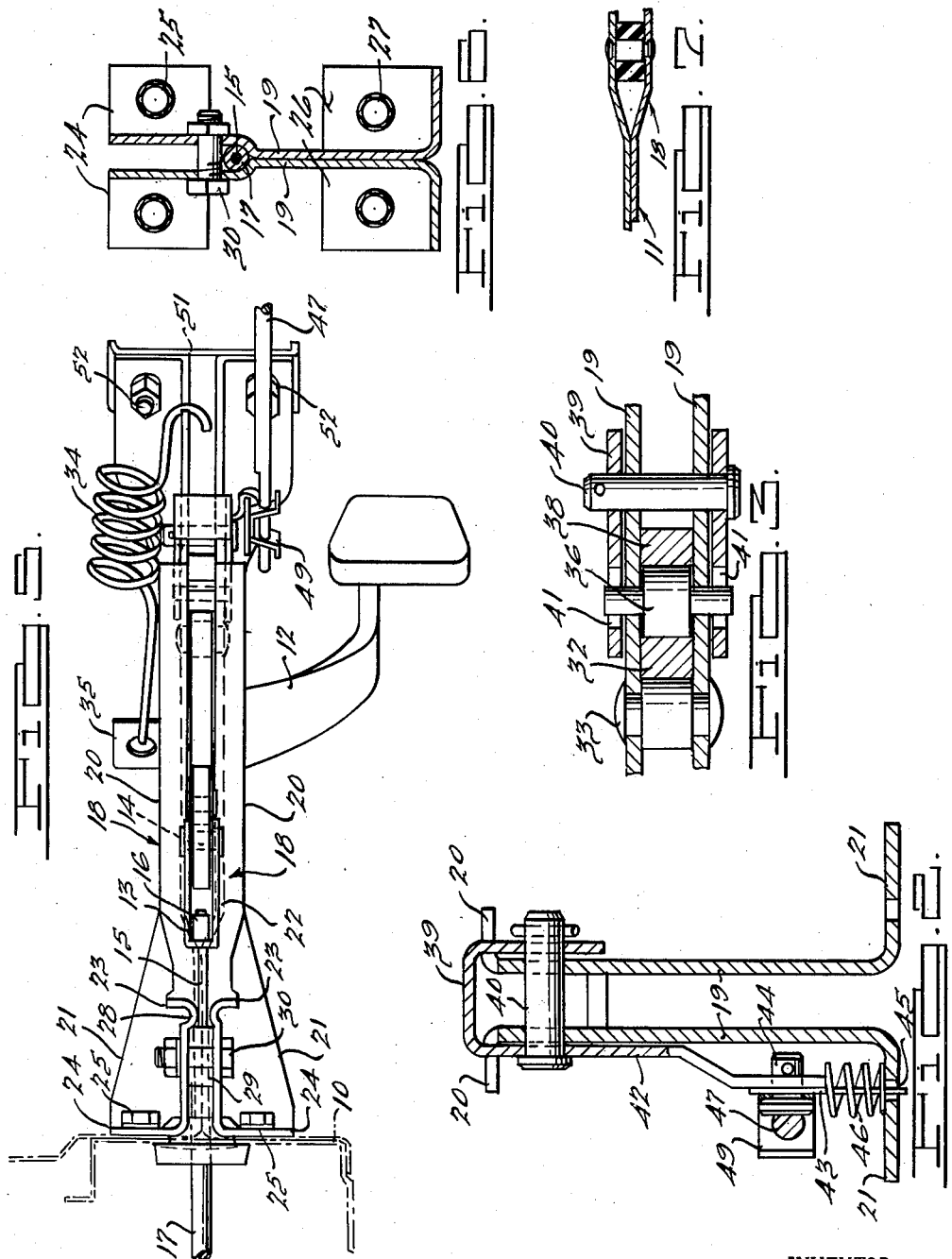

2,973,665

BRAKE CONTROL MECHANISM

George F. Mellen, Pontiac, and Wilhelm M. Rickert, Detroit, Mich., assignors to Chrysler Corporation, Highland Park, Mich., a corporation of Delaware Filed Mar. 5, 1956, Ser. No. 569,600

8 Claims. (Cl. 74—531)

This invention relates to improvements in a control or actuating mechanism which, by way of example and not by way of limitation, can be utilized for operation of a brake for a motor vehicle.

The invention in its broad aspects is directed to a mechanism including a stationary support structure, a lever, preferably foot operated, mounted on the support structure for movement relative thereto between normal or neutral position and an actuating position, and holding means for releasably retaining the lever in its operating position.

An object of the invention is the provision of such a mechanism which is strong and durable, requires a minimum of space for installation and operation, and in which the releasable holding means for the lever and manipulation means for the holding means are carried by the support structure.

Another object of the invention is the provision in such a mechanism of a lever support structure including main components which are constructed and arranged to provide the required strength for a minimum dimension in both height and breadth. In maintaining these dimensions to a minimum, the support structure includes components which are flanged to provide high resistance to twist or roll about longitudinal and transverse axes of the structure, it being understood that in many instances the structure is adapted to be attached to and project cantilever-like from a base. More specifically, the structure may include component walls which are brought together at a location lengthwise of the structure, these walls being relatively laterally spaced at another location of the structure to receive therebetween and to mount the lever and certain elements cooperating with the latter in alignment lengthwise of the structure. Forces tending to distort the support structure as aforesaid result when the thrust receiving end of the pedal is offset relative to this structure.

When the mechanism is utilized to control operation of a parking or emergency brake of a motor vehicle, for example, the lever is in the form of a pedal which is permitted to move to a brake applying position relative to the support structure and is releasably retained in such a position at the will of the vehicle operator. In carrying out the objects of the invention such holding means is carried by the aforesaid wall of the support structure and in the space therebetween.

The invention also includes a control for the holding means, such carried by the support for movement relative thereto between positions to respectively render the holding means operative or inoperative, and means biasing the control to either of such positions.

Other objects and advantages of the invention will be more apparent from the following description taken in connection with the accompanying drawings, in which:

Fig. 1 is a side elevational view of a control mechanism embodying the invention;

Figs. 2, 3 and 4 are sectional views respectively taken as indicated by the lines 2—2, 3—3 and 4—4 of Fig. 1;

Fig. 5 is a top plan view of the mechanism shown in Fig. 1;

Fig. 6 is a sectional view taken as indicated by the line 6—6 of Fig. 1; and

Fig. 7 is a fragmentary sectional view taken on line 7—7 of Fig. 1.

The invention is illustrated and described, by way of example and not by way of limitation, in conjunction with the control of a vehicle parking or emergency brake, and when thus utilized is disposed in the driver-occupied compartment and is preferably mounted on the wall which separates such compartment and the engine compartment. This wall is indicated by the numeral 10, and the support structure, generally designated by the numeral 11, is mounted on the wall 10 as more particularly hereinafter set forth. A lever 12, preferably in the form of a pedal, is carried by the support structure for swinging movement to and fro between a neutral position, as shown in full lines in Fig. 1, and a brake operating position as shown in dash and dot lines. A clevis 13 straddles the lever 12 and is connected thereto by a pin 14. A pull-type brake operating cable 15 extends through the end wall of clevis 13 and has a head 16 which is disposed between the clevis side walls and abuts the clevis end wall, thereby connecting the cable and clevis, the cable being suitably connected to the brake mechanism and having the usual sheath 17.

Referring to the support structure 11, the same includes two structural components 18 generally similar in construction and each has a vertical wall 19 which extends throughout the length of the structure. Each wall 19 for a portion of its length is spaced laterally relative to the other wall and has upper and lower flanges or projections 20 and 21 respectively, each wall 19 and its flanges defining in cross-section a channel with the walls 19 in spaced, back to back relation. Beginning at the lengthwise locaiton indicated at 22, the lower portions of the walls 19 are deflected to abut each other while the upper portions of such walls are laterally spaced, as shown more particularly in Fig. 6. This relationship of such upper and lower wall portions continues from the location 22 to the mounting end of the support structure, and the abutting wall portions are secured together as by welding.

The upper flanges or projections 20 terminate in upstanding flanges 23 intermediate the location 22 and the mounting end of the support structure, and each wall 19 has its height increased beyond the flanges and terminates in a laterally directed flange 24 which is bolted as at 25 to the wall 10. Each lower flange or projection 21 terminates in an upstanding flange 26 which is bolted as at 27 to the wall 10. The flanges 24 and 26 provide a substantial contact area with the wall 10 and minimize the localization of stress induced in the latter as an incident to actuation of the brake. The upper portions of the walls 19 are crimped together as at 28 to confine the cable 15 and also to provide an abutment for a cable-sheath housing 29 which is disposed between the upper spaced wall portions and retained by a bolt 30.

The pedal or lever 12 extends between the spaced walls 19 at the portion thereof which includes the flanges 20, 21 and is mounted by a pin 31 extending between and carried by the walls 19, the pedal fulcruming or swinging about such pin between the neutral and actuating positions. The upper end of the pedal projects above the support structure and an arm 32 in the form of a sector has a swivel connection at 32' with such end of the pedal for movement with the latter. Movement of the sector with the pedal is in the form of a partial revolution about the central axis of the pin 31, and is guided in such movement by an abutment 33 at the concave side. The abutment 33 extends between and is supported by the walls 19 and in addition to its guiding function also serves to secure the walls together in spaced relation. At least a portion of the sector 32 is disposed between the walls 19, in contact with the abutment 33, during movement of the sector between its full line position and its dot and dash line positions which respectively correspond to the disposition of the pedal in its neutral and actuating positions.

In the operation of a brake, the pedal 12 and sector 32 move relatively freely with respect to the support structure in a clockwise direction, as viewed in Fig. 1, that is from their full line positions to their dot and dash line positions, in order to apply the brake when the vehicle is parked and means is provided whereby they are releasably held in position to maintain the parking or emergency brake applied. However, the holding means may be conditioned to permit the pedal and sector to freely return to their neutral or full line positions following relief of actuating thrust applied at the pedal pad, under influence of a spring 34 connected at one end to a component 18 and at the other end to a bracket 35 carried by the pedal.

The holding means includes a member carried by the support structure and cooperating with the latter and the abutment 33 to releasably grip the sector between abutment and member to arrest movement of the sector in one direction it being understood that when the sector is so held the pedal is likewise held. The holding member in its illustrated form is a roller 36 disposed between the walls 19 and mounted thereon by tenons respectively extending into elongated openings 37 in the walls 19, as shown more particularly in Fig. 3, the openings 37 being elongated to permit movement of the roller 36 relative to the support structure. In its holding position, as illustrated in Fig. 1, the roller 36 coacts with a ramp surface of an element 38 extending between and mounted by the walls 19. The ramp surface and the adjacent face of the sector converge to form a wedging angle for cooperation with the roller to cause the latter to grip the sector and hold it and the pedal in brake applying position while permitting free movement of the pedal and sector to the brake applying position.

Control means for the holding member 36 includes a generally U-shaped member 39 which straddles the walls 19 and is pivotally connected thereto by a pin 40. Each leg of the member 39 has an opening 41 receiving a tenon of the roller holding member 36 for connecting the latter to the control member, the openings 41 being elongated in a direction normal to the direction of elongation of the openings to permit relative movement between the roller 36 and member 39 during swinging of the latter to selectively dispose the roller in either a holding position, as illustrated, or in a releasing position. A relatively long arm 42 of the control member 39 has a leg 43 secured thereto by a pin 44, the leg extending into an opening 45 in one of the flanges 21, as shown in Fig. 2. A spring 46 surrounds the leg 43 and acts between the flange 21 and end of the arm 42 to bias the member 39 to a position to dispose the roller in its illustrated folding position. Also, when the member 39 is rotated anti-clockwise, as viewed in Fig. 1 to a position to dispose the roller 36 in its releasing position, the spring also serves to bias the member 39 to its last mentioned position.

Means is provided for manipulating the member 39 and includes a manually actuating rod 47 mounted at one end in the vehicle dash and provided at such end with an operating knob 48. The rod is adjustably connected to the member 39 by a U-shaped spring clip 49 secured to the leg 42 of member 39 by the pin 44. Each arm of the clip 49 has an opening through which the rod 47 extends, in assembly the legs of the clip being contracted until their openings align, the rod 47 is then inserted through the openings and then its legs permitted to expand to grip the rod.

The support structure overlaps the dash and the latter has a channel shaped reinforcing element 50 to which is welded a bracket 51 which extends transversely of the support structure and is bolted to each of the flanges 21 as shown at 52.

In the operation, with the various components of the mechanism in their respective positions as shown herein, at which the brake to be actuated is in its released position, the pedal 12 and arm 32 are free to move to their dotted line positions by thrust applied at the pad end of the pedal to thereby apply the brake. When thrust on the pedal is released, the roller 36 is wedged between the ramp surface of abutment 38 and the adjacent surface of the sector and in cooperation with the abutment 33 holds the sector arm 32 and pedal 12 against return movement under the influence of the spring 34, which normally acts to urge the pedal against its stop 53 which extends between and is supported by the walls 19. To release this holding the knob 47 is pulled to its dot-dash position, as shown in Fig. 1, thus pulling the rod 47 to the right, as viewed in Fig. 1, thereby swinging the release member 39 counter-clockwise, as viewed in Fig. 1, to thereby withdraw the holding member 36 out of its wedging opening between the ramp surface of abutment 38 and the adjacent surface of the sector arm 32. The elongated openings in the walls 19 and in the member 39 permit movement of the roller 36 relative to its supporting walls 19 and the legs of the member 39. With the roller 36 thus withdrawn the sector and pedal can be moved to their brake releasing position by the spring 34. If desired the holding means can be retained in position to permit free movement of the pedal and sector between brake applying and releasing positions or the holding roller can be returned to its holding position, as shown, by thrusting the rod 47 to the left thus swinging the member 39 to its illustrated position.

We claim:

1. In combination, a stationary support having laterally spaced walls, an operating lever extending between said walls, a pin carried by said walls in the space therebetween mounting said lever for swinging movement, a sector extending into the space between said walls and rigidly connected with said lever for swinging movement with said lever as a unitary assembly, a combined stationary support reinforcing member and guide for said sector secured between said walls, detent means mounted on the support structure and disposed between said walls cooperating with said sector to hold said lever against swing movement in one direction, detent releasing means including a member pivotally carried by said support, and means connected to said last mentioned member for accommodating actuation thereof.

2. In combination, a stationary support having laterally spaced walls, an operating lever extending between said walls, a pin carried by said walls in the space therebetween mounting said lever for swinging movement, a sector extending into the space between said walls and connected with said lever for swinging movement in a direction corresponding to the direction of swing of the lever, a pair of spaced abutments, one on either side of said sector, fixed between said walls and reinforcing said stationary support, detent means including a detent member carried by said walls in the space therebetween for movement to a first position cooperating with said abutments and sector to hold said lever against swing movement in one direction and to a second position releasing said holding, means for releasing said detent member including a member carried by said support, and means connected to said last mentioned member for actuating the same.

3. In combination, a stationary support having laterally spaced walls, an operating lever extending between said walls, a pin carried by said walls in the space therebetween mounting said lever for swinging movement, a sector extending into the space between said walls and connected with said lever for swinging movement in a direction corresponding to the direction of swing of the lever, a combined reinforcing and stop member secured between said walls for limiting the swinging movement of said lever in one direction, a pair of abutments, one on either side of said sector, carried by the support and disposed between said walls, detent means including a detent member carried by said walls in the space therebetween for movement to a first position cooperating with said abutments and sector to hold said lever against swing movement in one direction and to a second position releasing said holding, means for releasing said detent member including a member pivotally carried by said support, a spring opposing pivotal movement of said releasing member in either direction, and means connected to said releasing member for effecting pivotal movement thereof.

4. In a control mechanism, a pedal, a support therefor including vertically disposed walls extending lengthwise of the support and relatively laterally spaced through a first part of the length thereof, at least a portion of each wall abutting and being secured to a portion of the other wall at a second part of the length thereof, each of said walls at said first part thereof having projections directed laterally therefrom in a direction away from the other wall, each of said upper projections terminating in an upstanding flange at a lengthwise extremity thereof, said walls and said lower projections extending lengthwise of the structure beyond said upstanding flanges and each terminating in an attaching flange directed laterally therefrom, said pedal extending between and pivotally supported by said walls at said first part thereof, an arm secured to the pedal for movement therewith, means for holding said pedal in adjusted position relative to the support including a member carried by said support and cooperating with said arm and support to releasably hold said pedal in its said adjusting position, means for releasing said holding means including a member connected to said holding member and carried by said support for movement relatively thereto to control releasing of said holding member, and means for manipulating said releasing member.

5. In a control mechanism, a lever, a support structure therefor having a mounting end and including a pair of structural members, each channel shaped in cross section throughout a part of the length thereof and arranged with the web-forming walls in laterally spaced relationship, one pair of correspondingly disposed leg-forming channel walls terminating at a lengthwise location short of the mounting end of said structure and the other pair of such leg-forming walls and said web-forming walls each having a part thereof continuing beyond said location and each thereof terminating in a relatively angular mounting flange at said end, a portion of each of said web-forming walls abutting the other and being secured together at said continuing parts thereof, said lever extending between said members at said channel section thereof, a pin between and mounted in said web-forming walls pivotally carrying said lever, an arm carried by said lever for movement therewith and adapted when held to hold said pedal, a holding member carried by said support structure for movement relative thereto and cooperating with said arm and support structure to releasably hold said arm against movement relative to said structure.

6. A brake actuating structure, a pedal movable between a brake releasing position and a brake actuating position, mechanism for releasably retaining said pedal in its said brake actuating position, a mounting for said pedal and mechanism including two brackets having adjacent flanged ends adapted to be attached to a support, each bracket having a wall arranged adjacent to and laterally spaced from a corresponding wall of the other bracket, said pedal extending into the space between said brackets and having opposite end portions projecting beyond said brackets in respective opposite directions, one of said end portions being adapted to be operatively connected to the brake to be actuated and the other end portion being adapted to receive an operating thrust, a pivot pin for said pedal extending between and mounted in said walls, a spring connected to said pedal and to one of said brackets operating to bias said pedal to its brake releasing position, a stop between and supported by said walls limiting movement of the pedal by said spring, a sector pivotally connected to said one end portion of said pedal for movement with the pedal, said sector registering with and moving in the space between said walls during movement of the pedal, said mechanism including one-way detent means operable to accommodate brake actuating movement of the pedal and sector and to releasably retain said pedal and sector in brake actuating position, said detent means including a detent member mounted by said walls in the space therebetween and releasably engageable with said sector to retain said pedal and sector against movement from a brake actuating position to a brake releasing position under the biasing of said spring.

7. In combination, a stationary support having laterally spaced walls, an operating lever extending between said walls, a pin carried by said walls in the space therebetween mounting said lever for swinging movement, a sector extending into the space between said walls and rigidly connected with said lever for swinging movement as a unitary assembly, detent means carried by said support structure and disposed between said walls cooperating with said sector to hold said lever against swinging movement in one direction, releasing means operably connected to said detent means including a member pivotally carried by said support, and manually operable means connected to said releasing means for accommodating actuation thereof.

8. In a vehicle having a passenger compartment provided with a forward wall and an instrument panel, a brake actuating mechanism comprising a stationary support fixed between said wall and said panel and having laterally spaced walls, an operating lever extending between said walls, a pin carried by said walls in the space therebetween mounting said lever for swinging movement, a sector extending into the space between said walls and rigidly connected with said lever for swinging movement as a unitary assembly, detent means carried by said support structure and disposed between said walls cooperating with said sector to hold said lever against swinging movement in one direction, releasing means operably connected to said detent means including a member pivotally carried by said support, and manually operable means connected to said releasing means for accommodating actuation thereof.

References Cited in the file of this patent

UNITED STATES PATENTS

| 74,926 | McLeod | Feb. 25, 1868 |
|---|---|---|
| 977,634 | Klasing | Dec. 6, 1910 |
| 1,257,723 | Menard | Feb. 26, 1918 |
| 2,299,508 | Skareen | Oct. 20, 1942 |
| 2,528,322 | Syverud | Oct. 31, 1950 |
| 2,587,725 | Hinsey | Mar. 4, 1952 |
| 2,638,017 | Sprung | May 12, 1953 |
| 2,703,499 | Reid | Mar. 8, 1955 |
| 2,851,900 | Powell | Sept. 16, 1958 |

FOREIGN PATENTS

| 454,377 | Canada | Feb. 1, 1949 |
|---|---|---|